US012223864B2

(12) United States Patent
Bai et al.

(10) Patent No.: US 12,223,864 B2
(45) Date of Patent: Feb. 11, 2025

(54) DISPLAY APPARATUS AND METHOD OF REPAIRING DISPLAY DEFECT IN DISPLAY PANEL

(71) Applicants: Ordos Yuansheng Optoelectronics Co., Ltd., Inner Mongolia (CN); BOE TECHNOLOGY GROUP CO., LTD., Beijing (CN)

(72) Inventors: Nini Bai, Beijing (CN); Yonghong Zhang, Beijing (CN); Liangliang Liu, Beijing (CN)

(73) Assignees: Ordos Yuansheng Optoelectronics Co., Ltd., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/021,590

(22) PCT Filed: Apr. 14, 2022

(86) PCT No.: PCT/CN2022/086806
§ 371 (c)(1),
(2) Date: Feb. 16, 2023

(87) PCT Pub. No.: WO2023/197241
PCT Pub. Date: Oct. 19, 2023

(65) Prior Publication Data
US 2024/0265836 A1 Aug. 8, 2024

(51) Int. Cl.
*G09G 3/00* (2006.01)
*G09G 3/3291* (2016.01)

(52) U.S. Cl.
CPC .......... *G09G 3/006* (2013.01); *G09G 3/3291* (2013.01); *G09G 2320/0233* (2013.01); *G09G 2330/08* (2013.01); *G09G 2330/10* (2013.01)

(58) Field of Classification Search
CPC ................ G09G 3/006; G09G 3/3291; G09G 2320/0233; G09G 2330/08; G09G 2330/10
See application file for complete search history.

(56) References Cited

U.S. PATENT DOCUMENTS

2014/0184671 A1 7/2014 Lee
2017/0206821 A1* 7/2017 Lee .................... H01L 27/1274
(Continued)

FOREIGN PATENT DOCUMENTS

CN 106328030 A 1/2017
CN 107331347 A 11/2017
(Continued)

*Primary Examiner* — Peter D McLoone
(74) *Attorney, Agent, or Firm* — HOUTTEMA LAW LLC

(57) ABSTRACT

A method of repairing a display defect in a display panel includes: in a module process stage, inputting a first data voltage to each pixel in the display panel, enabling the display panel to display an image to be detected, and acquiring a brightness of each pixel; determining a reference pixel and a defect pixel according to the image to be detected; calculating a compensation data voltage for the defect pixel according to a brightness difference between the reference pixel and the defect pixel; and inputting the first data voltage to the reference pixel, and inputting a second data voltage to the defect pixel, according to the compensation data voltage, where the second data voltage is a sum of the first data voltage and the compensation data voltage.

16 Claims, 2 Drawing Sheets

(56) References Cited

U.S. PATENT DOCUMENTS

| | | | | |
|---|---|---|---|---|
| 2017/0352310 | A1 | 12/2017 | Kim et al. | |
| 2020/0090565 | A1 | 3/2020 | Sawahata | |
| 2021/0110787 | A1* | 4/2021 | Buckley | G06T 5/77 |
| 2021/0312849 | A1* | 10/2021 | Park | G09G 3/006 |

FOREIGN PATENT DOCUMENTS

| | | | |
|---|---|---|---|
| CN | 109444172 | A | 3/2019 |
| CN | 109727569 | A | 5/2019 |
| CN | 209215256 | U | 8/2019 |
| CN | 110580885 | A | 12/2019 |
| CN | 111554238 | A | 8/2020 |
| CN | 112950657 | A | 6/2021 |
| CN | 113160768 | A | 7/2021 |
| CN | 113241030 | A | 8/2021 |
| CN | 113284461 | A | 8/2021 |
| CN | 113496688 | A | 10/2021 |
| CN | 113627428 | A | 11/2021 |

* cited by examiner

DISPLAY APPARATUS AND METHOD OF REPAIRING DISPLAY DEFECT IN DISPLAY PANEL

TECHNICAL FIELD

The present disclosure belongs to the technical field of display, and particularly relates to a display apparatus and a method of repairing a display defect in a display panel.

BACKGROUND

An Organic Light-Emitting Diode (OLED) is a light-emitting device using an organic solid semiconductor as a light-emitting material, and has a wide application prospect due to its advantages of simple manufacturing process, low cost, low power consumption, high luminance, wide range of operating temperature, and the like.

However, the backplane circuit of the current OLED product is complicated, and the current OLED product encounters higher challenges in process than the traditional Liquid Crystal Display (LCD) product, such as a thinner line width, a smaller volume, a stacked structure of more films, and the like. More complicated and dense backplane circuit distribution brings more spot type/line type display defects, such as a bright spot defect, to the OLED product. The steps of repairing the defects are complicated, the repair rate is low, the labor cost is high, and the productivity is low.

SUMMARY

The present disclosure aims to solve at least one technical problem in the prior art and provides a display apparatus and a method of repairing a display defect in a display panel.

In a first aspect, an embodiment of the present disclosure provides a method of repairing a display defect in a display panel, including:

in a module process stage, inputting a first data voltage to each pixel in the display panel, enabling the display panel to display an image to be detected, and acquiring a brightness of each pixel;

determining a reference pixel and a defect pixel according to the image to be detected;

calculating a compensation data voltage for the defect pixel according to a brightness difference between the reference pixel and the defect pixel; and inputting the first data voltage to the reference pixel, and inputting a second data voltage to the defect pixel, according to the compensation data voltage, where the second data voltage is a sum of the first data voltage and the compensation data voltage.

Optionally, the acquiring a brightness of each pixel includes:

photographing the image to be detected using a high-definition camera, and acquiring a picture of the image to be detected; and converting the picture into matrix data through Fourier transform, and performing enhancement processing on the matrix data to acquire the brightness of each pixel.

Optionally, the performing enhancement processing on the matrix data includes:

squaring or logarithmizing the matrix data.

Optionally, the compensation data voltage includes a first compensation data voltage; and the first compensation data voltage is a difference between a peak value of the first data voltage input to the reference pixel and a current data voltage of the defect pixel.

Optionally, the compensation data voltage further includes a second compensation data voltage; and the second compensation data voltage is obtained through calculating with a compensation algorithm.

Optionally, each pixel includes a red sub-pixel, a green sub-pixel and a blue sub-pixel; and the inputting a first data voltage to each pixel in the display panel includes:

sequentially inputting a first red data voltage, a first green data voltage and a first blue data voltage to each red sub-pixel, each green sub-pixel and each blue sub-pixel in the display panel, respectively.

Optionally, the determining a reference pixel and a defect pixel includes:

determining a criterion driving current according to a known normal display panel and a known defect display panel;

acquiring a current driving current of each pixel, and comparing the current driving current of each pixel with the criterion driving current;

determining the pixel is as the defect pixel if the current driving current of a pixel is greater than the criterion driving current; and determining the pixel is as the reference pixel if the current driving current of the pixel is less than or equal to the criterion driving current.

Optionally, the determining a criterion driving current includes:

acquiring a first driving current of each pixel in each of a plurality of known normal display panels, and recording a maximum value of the first driving current;

acquiring a second driving current of each pixel in each of a plurality of known display panels with a brightness defect, and recording a minimum value of the second driving current;

comparing the maximum value of the first driving current with the minimum value of the second driving current, and determining the minimum value of the second driving current as the criterion driving current, if a ratio of the maximum value of the first driving current to the minimum value of the second driving current is greater than a preset value.

Optionally, the calculating a compensation data voltage for the defect pixel according to a brightness difference between the reference pixel and the defect pixel includes:

adjusting a brightness of the defect pixel to enable a current of the defect pixel to be less than or equal to the criterion driving current;

recording data voltages of the defect pixel before and after the adjusting a brightness of the defect pixel; and calculating the compensation data voltage according to the data voltages of the defect pixel before and after the adjusting a brightness of the defect pixel.

Optionally, subsequent to the calculating a compensation data voltage for the defect pixel according to a brightness difference between the reference pixel and the defect pixel, the method further includes:

storing the compensation data voltage.

Optionally, subsequent to the storing the compensation data voltage, the method further includes:

extracting the stored compensation data voltage, and inputting the compensation data voltage to the defect pixel; and;

determining that the display defect is successfully repaired if a brightness of the defect pixel is less than or equal to a brightness of the reference pixel.

In a second aspect, an embodiment of the present disclosure provides a display apparatus, including a display panel and a storage module, where the storage module stores a compensation data voltage; the compensation data voltage is obtained through the method of repairing a display defect in a display panel according to the above description.

DETAIL DESCRIPTION OF EMBODIMENTS

Figure 1:
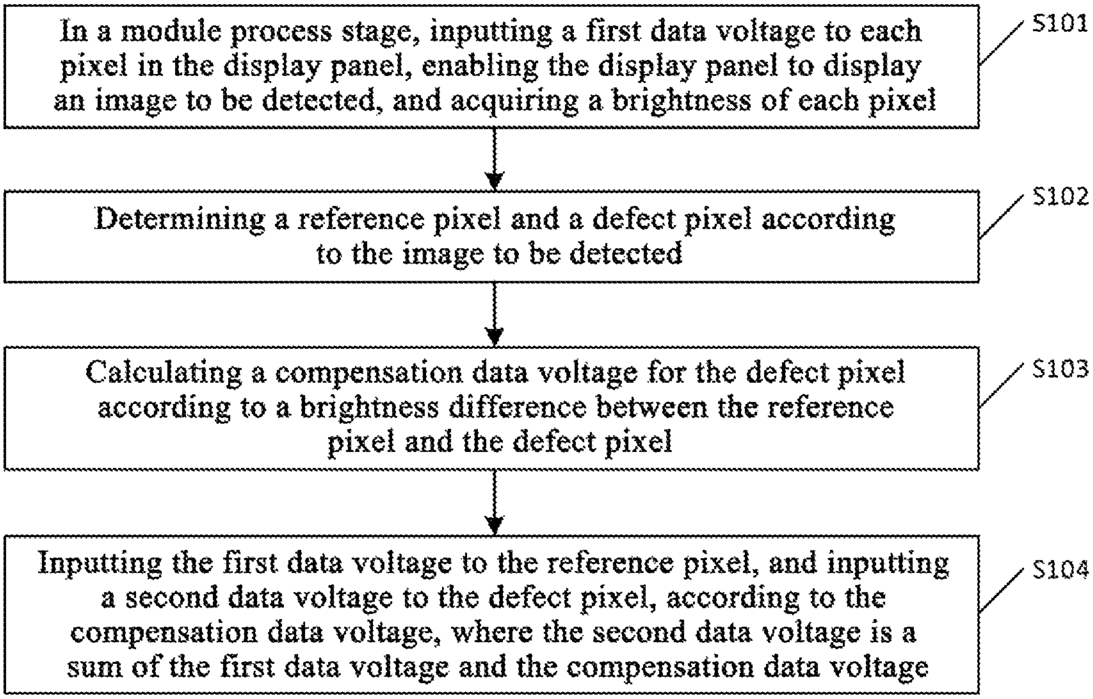
FIG. 1 is a schematic flowchart illustrating a method of repairing a display defect in a display panel according to an embodiment of the present disclosure.

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which this disclosure belongs. The use of "first", "second", and the like in the present disclosure is not intended to indicate any order, quantity, or importance, but rather serves to distinguish one element from another. Also, the term "a", "an", "the" or the like does not denote a limitation of quantity, but rather denotes the presence of at least one. The word "comprising", "comprises", or the like means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

Compared with the traditional LCD product, the OLED product has absolute advantages in terms of display images, power consumption, and the like, for example, the OLED product has high brightness, wide color gamut, large view angle, transparent display, ultra-thinness, low power consumption, and the like. Therefore, the OLED product is more and more trusted by users. The manufacturing process of the OLED product is mainly divided into four process stages, namely a color film substrate (color film) process stage, an array substrate (array) process stage, a panel (cell) process stage and a module process stage.

At present, a lightening test is required for a display panel subsequent to the cell stage, and if a display defect, for example, a bright spot defect is found in the display panel, the bright spot defect is repaired. Generally, the process of repairing the bright spot defect is as follows: 1) performing a lightening test on the display panel with a lightening equipment to detect the bright spot defect of the display panel; 2) making a special mark (a circles, a triangle or other symbols) at the position of the bright spot defect, and transferring the display panel with the bright spot defect to a maintenance process; 3) manually putting the display panel with the bright spot defect into a maintenance equipment and manually lightening display panel with the bright spot defect, and searching for the position of the bright spot defect by an operator with a Charge Coupled Device (CCD) camera lens according to the special mark; and 4) manually moving a laser maintenance probe to the position of the bright spot defect, and performing cutting repair. After the repair is finished, the display panel is subjected to a secondary detection process, and the repaired screen is subjected to a secondary lightening detection to confirm the repair effect. If the repair is successful, the display panel is normally transferred to a next station, and if the repair is failed, the product is scrapped. As can be seen from steps of repairing the bright spot defect, most of the existing methods of repairing bright spot adopt manual operation, the repairing steps are complicated and are greatly influenced by human factors, which is not beneficial for improving the efficiency of repairing bright spot defect, so that the repair rate is low, meanwhile, the labor cost is high, and the productivity of OLED products is influenced.

In order to solve at least one of the above technical problems, embodiments of the present disclosure provide a display apparatus and a method of repairing a display defect in a display panel, and the display apparatus and the method of repairing a bright spot in a display panel provided by embodiments of the present disclosure will be described below in further detail with reference to the accompanying drawings and specific embodiments.

In a first aspect, an embodiment of the present disclosure provides a method of repairing a display defect in a display panel. FIG. 1 is a schematic flowchart illustrating a method of repairing a display defect in a display panel according to an embodiment of the present disclosure. As shown in FIG. 1, the method of repairing a display defect in a display panel according to the embodiment of the present disclosure includes the following steps S101 to S104.

Step S101, in a module process stage, inputting a first data voltage to each pixel in the display panel, enabling the display panel to display an image to be detected, and acquiring a brightness of each pixel.

In step S101, the first data signal is a test data signal, the display panel is basically assembled in the module process stage, a series of tests on display defects, such as mura (uneven brightness), are required to be performed on the display panel in the module process stage, and the first data voltage may be input to each pixel in the module process stage to lighten each pixel to form the image to be detected. The brightness of each pixel is acquired through the formed image to be detected.

Step S102, determining a reference pixel and a defect pixel according to the image to be detected.

In step S102, if there is a display defect in the display panel, a brightness of this spot in the image to be detected is different from the brightness of the surrounding area, and generally the defect pixels in the display panel occupy only a small portion of all the pixels, so that it may be determined whether the pixels in the display panel are normal or not, and some of the normal pixels determined as reference pixels, and an abnormal pixel different from the normal pixels are determined as the defect pixel. For example, in a range of 4×4 pixels, where the brightness of the second pixel in the second row is significantly higher than the brightness of other surrounding pixels, the second pixel in the second row is a defect pixel.

Step S103, calculating a compensation data voltage for the defect pixel according to a brightness difference between the reference pixel and the defect pixel.

In step S103, the brightness of the defect pixel in the display panel is much higher than the brightness of the reference pixel, and the compensation data voltage for the defect pixel may be calculated according to the brightness difference between the reference pixel and the defect pixel, where the compensation data voltage may be a difference between a peak value of the data voltage input to each reference pixel and the current data voltage of the defect pixel, so that the brightness of the defect pixel is reduced, and the brightness of the defect pixel is lower than or equal to the brightness of the reference pixel, thereby realizing display defect repair of the display panel.

Step S104, inputting the first data voltage to the reference pixel, and inputting a second data voltage to the defect pixel, according to the compensation data voltage, where the second data voltage is a sum of the first data voltage and the compensation data voltage.

In step S104, the first data voltage is input to the reference pixel, and the first data voltage and the compensation data voltage are simultaneously input to the defect pixel. In the display panel, the brightness of the pixel is determined by a current passing through the pixel, and the current $Id=K\times(Vdata-VDD)^2$, where K is a constant, Vdata may represent the first data voltage, and VDD is a fixed power voltage. In the formula of current, Vdata is a variable, and the current Id is controlled by adjusting Vdata, so that the brightness of the pixel is controlled. The greater the current Id is, the higher the brightness of the pixel is. In practical applications, $Vdata\leq VDD$ (depending on the switching characteristics of the thin film transistors themselves in the display panel), so the greater Vdata is, the lower the value of $(Vdata-VDD)^2$ is, i.e., the lower the current Id is, the lower the brightness is. On the basis of the original first data voltage, the compensation data voltage is input to form the second data voltage, the second data voltage is greater than the first data voltage, and therefore the current Id of the defect pixel can be reduced, the brightness of the defect pixel is lower than or equal to the brightness of the reference pixel, and display defect repair of the display panel is achieved.

According to the method of repairing the display defects of the display panel, the defect pixel in the display panel is repaired with the compensation data voltage in the module process stage, so that the brightness of the spot defect pixel is lower than or equal to the brightness of the reference pixel, the display defect of the display panel can be repaired without lightening test in the cell process stage, manual repair can be changed into automatic feedback repair realized by controlling the data signal input to the defect pixel, waste of labor and equipment cost in the module process stage can be reduced, meanwhile, the precision and success rate of repairing the display defect in the display panel can be greatly improved, thereby the efficiency of repairing the display defect in the display panel can be greatly improved, and the productivity of OLED products can be improved. On the other hand, since the display defect repair is completed in the module process stage, a secondary damage to the display panel in the module process stage can be avoided, so that the cost of repairing the bright spot can be further reduced, and the product competitiveness can be improved.

Figure 2:
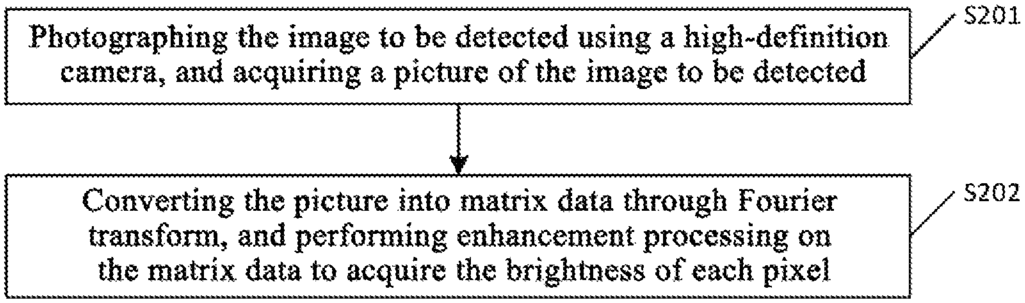
FIG. 2 is a schematic flowchart illustrating a method of acquiring a brightness of each pixel according to an embodiment of the present disclosure.

In some embodiments, FIG. 2 is a schematic flowchart illustrating a method of acquiring a brightness of each pixel according to an embodiment of the present disclosure. As shown in FIG. 2, acquiring the brightness of each pixel includes the following steps S201 and S202.

S201, photographing the image to be detected using a high-definition camera, and acquiring a picture of the image to be detected.

S202, converting the picture into matrix data through Fourier transform, and performing enhancement processing on the matrix data to acquire the brightness of each pixel.

In practical application, the brightness of each pixel in the display panel may be acquired in various ways, and in the embodiment of the present disclosure, a high definition camera may be used to photograph the image to be detected formed by inputting the first data voltage, so as to acquire image information of the image to be detected. The image information is transmitted to a processor, which may be a computer, and the computer may convert the image information into matrix data through Fourier transform. In order to further obtain the brightness of each pixel more accurately, an enhancement processing may be performed on the matrix data.

In some embodiments, performing enhancement processing on the matrix data includes: squaring or logarithmizing the matrix data.

Through squaring or logarithmizing the matrix data, the brightness of each defect pixel is brighter, the contrast with surrounding reference pixels is improved, the brightness of each pixel is further accurately acquired, the reference pixel and the defect pixel are accurately determined, and a misjudgment of the defect pixel is prevented from occurring, and thus the efficiency of repairing defect is prevented from being affected.

In some embodiments, the compensation data voltage includes a first compensation data voltage, and the first compensation data voltage is a difference between a peak value of the data voltage input to the reference pixel and the current data voltage of the defect pixel.

The first compensation data voltage is $\Delta V(ng)=Vmax-V(ng)$, where Vmax is the peak value of the data voltage input to the reference pixel, V(ng) is the current data voltage of the defect pixel. That is, the first compensation data voltage is a difference between the peak value of the data voltage input to the reference pixel and the current data voltage of the defect pixel, and the data voltage of the defect pixel after compensation is Vmax. According to the formula of current: $Id=K\times(Vdata-VDD)^2$, the data voltage after compensation Vdata=Vmax is close to VDD, the current Id is close to zero, the brightness of the defect pixel is almost zero, and the pixel is changed from a bright spot to a dark spot, thereby realizing the display defect repair.

In some embodiments, the compensation data voltage further includes a second compensation data voltage, and the second compensation data voltage is obtained through calculating with a compensation algorithm.

In addition to the first compensation data voltage for compensating the display defect, the compensation data voltage further includes the second compensation data voltage for compensating the mura defect, and the second compensation data voltage may be obtained through a mura compensation algorithm, so that the display defect of the display panel can be directly compensated when the mura defect of the display panel is compensated in a module process stage, the steps of detection and repair can be reduced, the efficiency of repairing the display panel is improved, and the productivity of the display panel is further improved.

In some embodiments, the pixel includes red, green and blue sub-pixels; sequentially inputting a first data voltage to each pixel in a display panel includes: inputting a first red data voltage, a first green data voltage and a first blue data voltage to each red sub-pixel, each green sub-pixel and each blue sub-pixel in the display panel, respectively.

Each pixel may be composed of a red sub-pixel, a green sub-pixel and a blue sub-pixel, and alternatively, each pixel may be further provided with a white sub-pixel, the implementation principle of the white sub-pixel is the same as the implementation principle of a case where three sub-pixels are provided, and the detailed description is omitted. When inputting the first data voltage to each pixel in the display panel, a same data voltage may be input to the sub-pixels of the same color at each time, so that the display panel displays an image of only one color, such as a red image, a green image or a blue image, which is more favorable to determine the position of a defect pixel. When the display panel has a display defect in a sub-pixel of only one color, the sub-pixels of other colors are not required to be repaired, so that efficiency of repairing the bright spot can be improved.

Figure 3:
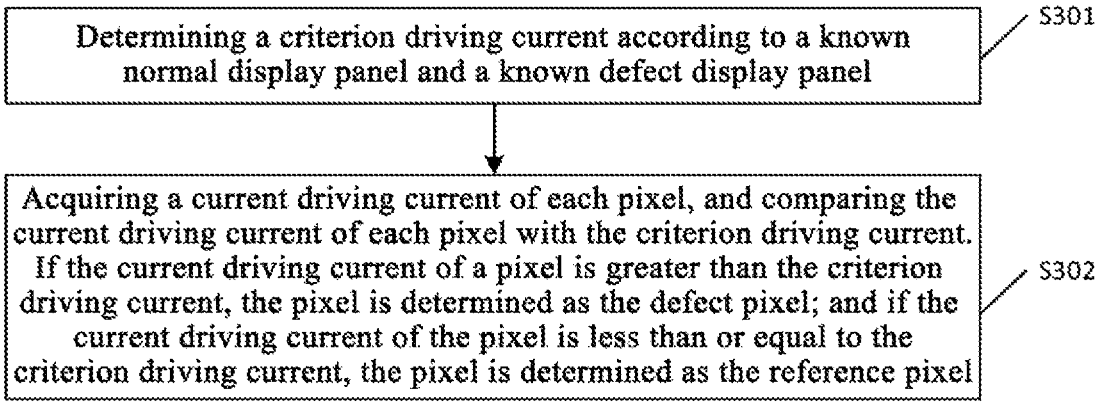
FIG. 3 is a schematic flowchart illustrating a method of determining a reference pixel and a defect pixel according to an embodiment of the present disclosure.

In some embodiments, FIG. 3 is a schematic flowchart illustrating a method of determining a reference pixel and a defect pixel according to an embodiment of the present disclosure. As shown in FIG. 3, determining the reference pixel and the defect pixel includes the following steps S301 and S302.

S301, determining a criterion driving current according to a known normal display panel and a known defect display panel.

S302, acquiring a current driving current of each pixel, and comparing the current driving current of each pixel with the criterion driving current. If the current driving current of a pixel is greater than the criterion driving current, the pixel is determined as the defect pixel; and if the current driving current of the pixel is less than or equal to the criterion driving current, the pixel is determined as the reference pixel.

In practical application, each pixel in the display panel can be scanned dot by dot, and the current driving current of each pixel is acquired and recorded. The greater the driving current is, the higher the brightness of the pixel is. If the current driving current of the pixel is greater than the criterion driving current, this indicates that the brightness of the pixel is greater than the brightness of the normal pixel, and the display defect exists. If the current driving current of the pixel is less than or equal to the criterion driving current, this indicates that the brightness of the pixel is less than or equal to the brightness of a normal pixel, and the pixel is a normal pixel and can be determined as the reference pixel. Therefore, the position of the defect pixel is not required to be determined by manual operation, and an error caused by manual operation can be avoided, so that the efficiency of repairing a bright spot can be improved, and the productivity of the display panel can be improved.

Figure 4:
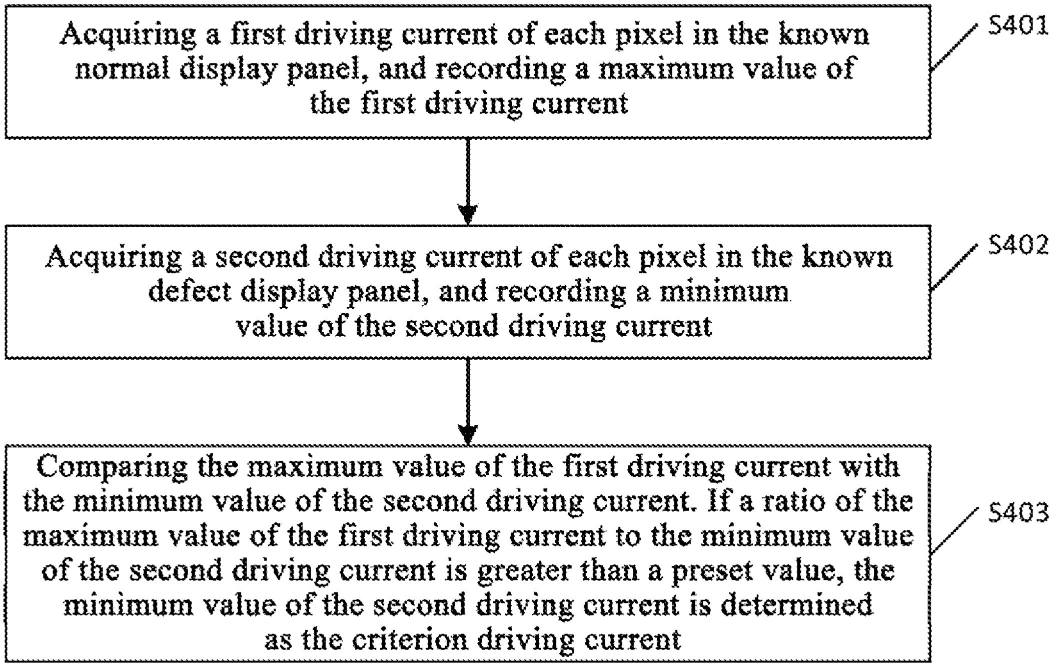
FIG. 4 is a schematic flowchart illustrating a method of determining a criterion driving current according to an embodiment of the present disclosure.

FIG. 4 is a schematic flowchart illustrating a method of determining a criterion driving current according to an embodiment of the present disclosure. In some embodiments, as shown in FIG. 4, the method of determining the criterion driving current includes the following steps S401 to S403.

S401, acquiring a first driving current of each pixel in the known normal display panel, and recording a maximum value of the first driving current.

S402, acquiring a second driving current of each pixel in the known defect display panel, and recording a minimum value of the second driving current.

S403, comparing the maximum value of the first driving current with the minimum value of the second driving current. If a ratio of the maximum value of the first driving current to the minimum value of the second driving current is greater than a preset value, the minimum value of the second driving current is determined as the criterion driving current.

During practical application, the first driving current of each pixel in the known normal display panel may be acquired, and the maximum value Id(OK-max) of the first driving current is recorded; and the second driving current of each pixel in the known display panel with the display defect is acquired, and the minimum value Id(NG-min) of the second driving current is recorded. Comparing Id(OK-max) with Id(NG-min), if Id(OK-max)/Id(NG-min) is greater than a preset value, which may be 50%, 60%, or 70%, Id(NG-min) is determined as the reference driving current. It may be understood that the preset value may be set according to actual requirements, and the value should not be set too low, to prevent that misjudgment on defect pixels from occurring.

Figure 5:
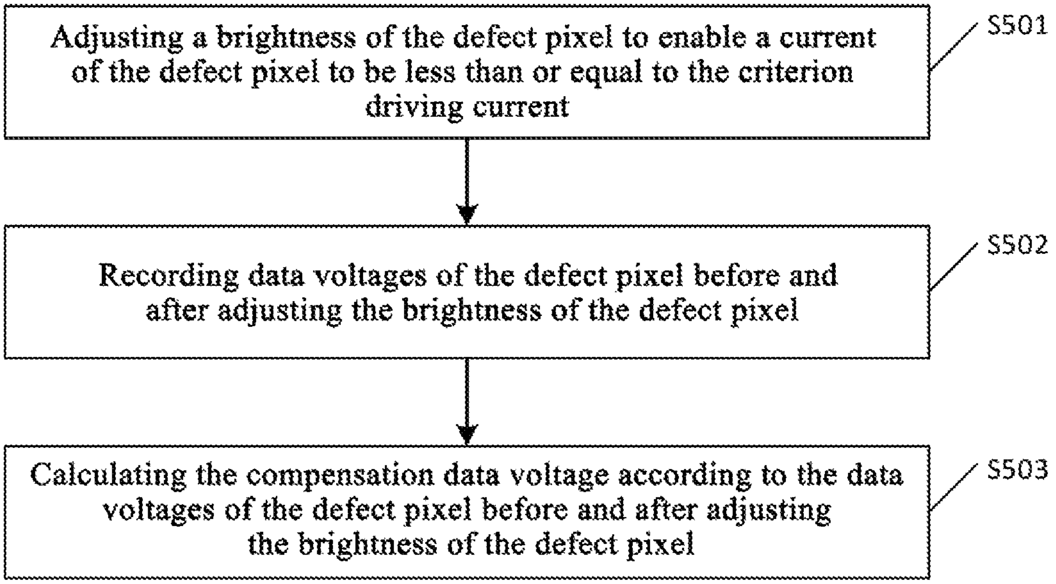
FIG. 5 is a schematic flowchart illustrating a method of calculating a compensation data voltage for a defect pixel according to an embodiment of the present disclosure.

FIG. 5 is a schematic flowchart illustrating a method of calculating a compensation data voltage for a defect pixel according to an embodiment of the present disclosure. In some embodiments, and as shown in FIG. 5, the method of calculating the compensation data voltage for the defect pixel includes the following steps S501 to S503.

S501, adjusting a brightness of the defect pixel to enable a current of the defect pixel to be less than or equal to the criterion driving current.

S502, recording data voltages of the defect pixel before and after adjusting the brightness of the defect pixel.

S503, calculating the compensation data voltage according to the data voltages of the defect pixel before and after adjusting the brightness of the defect pixel.

In practical application, since the brightness of the pixel is positively correlated with the driving current of the pixel, the magnitude of the driving current can be adjusted by adjusting the data voltage input to the pixel, so that the driving current of the pixel with the display defect is less than or equal to the criterion driving current, and the brightness of the defect pixel can be reduced to be the same as the brightness of the surrounding normal pixels, or the defect pixel is adjusted to be a dark spot, so as to complete the repair of the display defect. Meanwhile, the data voltages of the defect pixel before and after adjusting the brightness of the defect pixel are recorded, respectively, and the difference between the two data voltages is the compensation data voltage to be input.

In some embodiments, subsequent to calculating a compensation data voltage for the defect pixel according to a brightness difference between the reference pixel and the defect pixel, the method further includes: storing the compensation data voltage.

The compensation data voltage may be stored in a storage module of the display module. In the application process of the display module, the stored compensation data voltage may be directly called from the storage module so as to compensate display defect pixels in the display panel, so that a display image is uniform, the display effect is improved, and the use experience of a user is improved.

In some embodiments, subsequent to storing the compensation data voltage, the method further includes: extracting the stored compensation data voltage, and inputting the compensation data voltage to the defect pixel; and determining that the display defect is successfully repaired if a brightness of the defect pixel is less than or equal to a brightness of the reference pixel.

After the data voltage is compensated, it is further required to confirm the repair of the display defect of the display panel to determine whether the stored compensation data voltage meets the requirement on repairing the bright spot. Specifically, the stored compensation data voltage may be directly extracted and input to a defect pixel, and whether the display defect exists in the display panel is detected by observing or detecting the driving current. If the display defect does not exist, the display defect is confirmed to be successfully repaired, and if the display defect still exists, the display defect is determined to be failed to be repaired, and the display panel is scrapped.

In a second aspect, the present embodiment provides a display apparatus, including a display panel and a memory module, where the memory module stores a compensation data voltage; the compensation data voltage is obtained through the method of repairing a display defect in a display panel according to any one of the embodiments. The display apparatus may be any product or component having a display function, such as a mobile phone, a tablet computer, a television, a monitor, a notebook computer, a digital photo frame, a navigator, or the like. The implementation principle and the beneficial effect of the display apparatus are the same as those of the method of repairing a display defect in a display panel, and are not described herein again.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and essence of the present disclosure, and such modifications and improvements are also considered to be within the protection scope of the present disclosure.

What is claimed is:

1. A method of repairing a display defect in a display panel, comprising:

in a module process stage, inputting a first data voltage to each pixel in the display panel, enabling the display panel to display an image to be detected, and acquiring a brightness of each pixel;

determining a reference pixel and a defect pixel according to the image to be detected;

calculating a compensation data voltage for the defect pixel according to a brightness difference between the reference pixel and the defect pixel; and inputting the first data voltage to the reference pixel, and inputting a second data voltage to the defect pixel, according to the compensation data voltage, wherein the second data voltage is a sum of the first data voltage and the compensation data voltage, wherein the determining a reference pixel and a defect pixel comprises:

determining a criterion driving current according to a known normal display panel and a known defect display panel;

acquiring a current driving current of each pixel, and comparing the current driving current of each pixel with the criterion driving current;

determining the pixel is as the defect pixel if the current driving current of a pixel is greater than the criterion driving current; and determining the pixel is as the reference pixel if the current driving current of the pixel is less than or equal to the criterion driving current, wherein the determining a criterion driving current comprises:

acquiring a first driving current of each pixel in the known normal display panel, and recording a maximum value of the first driving current;

acquiring a second driving current of each pixel in the known defect display panel, and recording a minimum value of the second driving current;

comparing the maximum value of the first driving current with the minimum value of the second driving current, and determining the minimum value of the second driving current as the criterion driving current, if a ratio of the maximum value of the first driving current to the minimum value of the second driving current is greater than a preset value.

2. The method of repairing a display defect in a display panel according to claim 1, wherein the acquiring a brightness of each pixel comprises:

photographing the image to be detected using a high-definition camera, and acquiring a picture of the image to be detected; and converting the picture into matrix data through Fourier transform, and performing enhancement processing on the matrix data to acquire the brightness of each pixel.

3. The method of repairing a display defect in a display panel according to claim 2, wherein the performing enhancement processing on the matrix data comprises:

squaring or logarithmizing the matrix data.

4. The method of repairing a display defect in a display panel according to claim 3, wherein the compensation data voltage comprises a first compensation data voltage; and the first compensation data voltage is a difference between a peak value of the first data voltage input to the reference pixel and a current data voltage of the defect pixel.

5. The method of repairing a display defect in a display panel according to claim 4, wherein the compensation data voltage further comprises a second compensation data voltage; and the second compensation data voltage is obtained through calculating with a compensation algorithm.

6. A display apparatus, comprising a display panel and a storage module, wherein the storage module stores a compensation data voltage; the compensation data voltage is obtained through the method of repairing a display defect in a display panel according to claim 5.

7. A display apparatus, comprising a display panel and a storage module, wherein the storage module stores a compensation data voltage; the compensation data voltage is obtained through the method of repairing a display defect in a display panel according to claim 4.

8. A display apparatus, comprising a display panel and a storage module, wherein the storage module stores a compensation data voltage; the compensation data voltage is obtained through the method of repairing a display defect in a display panel according to claim 3.

9. The method of repairing a display defect in a display panel according to claim 2, wherein each pixel comprises a red sub-pixel, a green sub-pixel and a blue sub-pixel; and the inputting a first data voltage to each pixel in the display panel comprises:

sequentially inputting a first red data voltage, a first green data voltage and a first blue data voltage to each red sub-pixel, each green sub-pixel and each blue sub-pixel in the display panel, respectively.

10. A display apparatus, comprising a display panel and a storage module, wherein the storage module stores a compensation data voltage; the compensation data voltage is obtained through the method of repairing a display defect in a display panel according to claim 9.

11. A display apparatus, comprising a display panel and a storage module, wherein the storage module stores a compensation data voltage; the compensation data voltage is obtained through the method of repairing a display defect in a display panel according to claim 2.

12. The method of repairing a display defect in a display panel according to claim 1, wherein the calculating a compensation data voltage for the defect pixel according to a brightness difference between the reference pixel and the defect pixel comprises:

adjusting a brightness of the defect pixel to enable a current of the defect pixel to be less than or equal to the criterion driving current;

recording data voltages of the defect pixel before and after the adjusting a brightness of the defect pixel; and calculating the compensation data voltage according to the data voltages of the defect pixel before and after the adjusting a brightness of the defect pixel.

13. A display apparatus, comprising a display panel and a storage module, wherein the storage module stores a compensation data voltage; the compensation data voltage is obtained through the method of repairing a display defect in a display panel according to claim 12.

14. The method of repairing a display defect in a display panel according to claim 1, wherein subsequent to the calculating a compensation data voltage for the defect pixel according to a brightness difference between the reference pixel and the defect pixel, the method further comprises:

storing the compensation data voltage.

15. The method of repairing a display defect in a display panel according to claim 14, wherein subsequent to the storing the compensation data voltage, the method further comprises:

extracting the stored compensation data voltage, and inputting the compensation data voltage to the defect pixel; and;

determining that the display defect is successfully repaired if a brightness of the defect pixel is less than or equal to a brightness of the reference pixel.

16. A display apparatus, comprising a display panel and a storage module, wherein the storage module stores a compensation data voltage; the compensation data voltage is obtained through the method of repairing a display defect in a display panel according to claim 1.

* * * * *